Oct. 8, 1968  P. C. KOOMEY ET AL  3,405,387
ACOUSTICAL UNDERWATER CONTROL APPARATUS
Filed Oct. 24, 1965  6 Sheets-Sheet 3

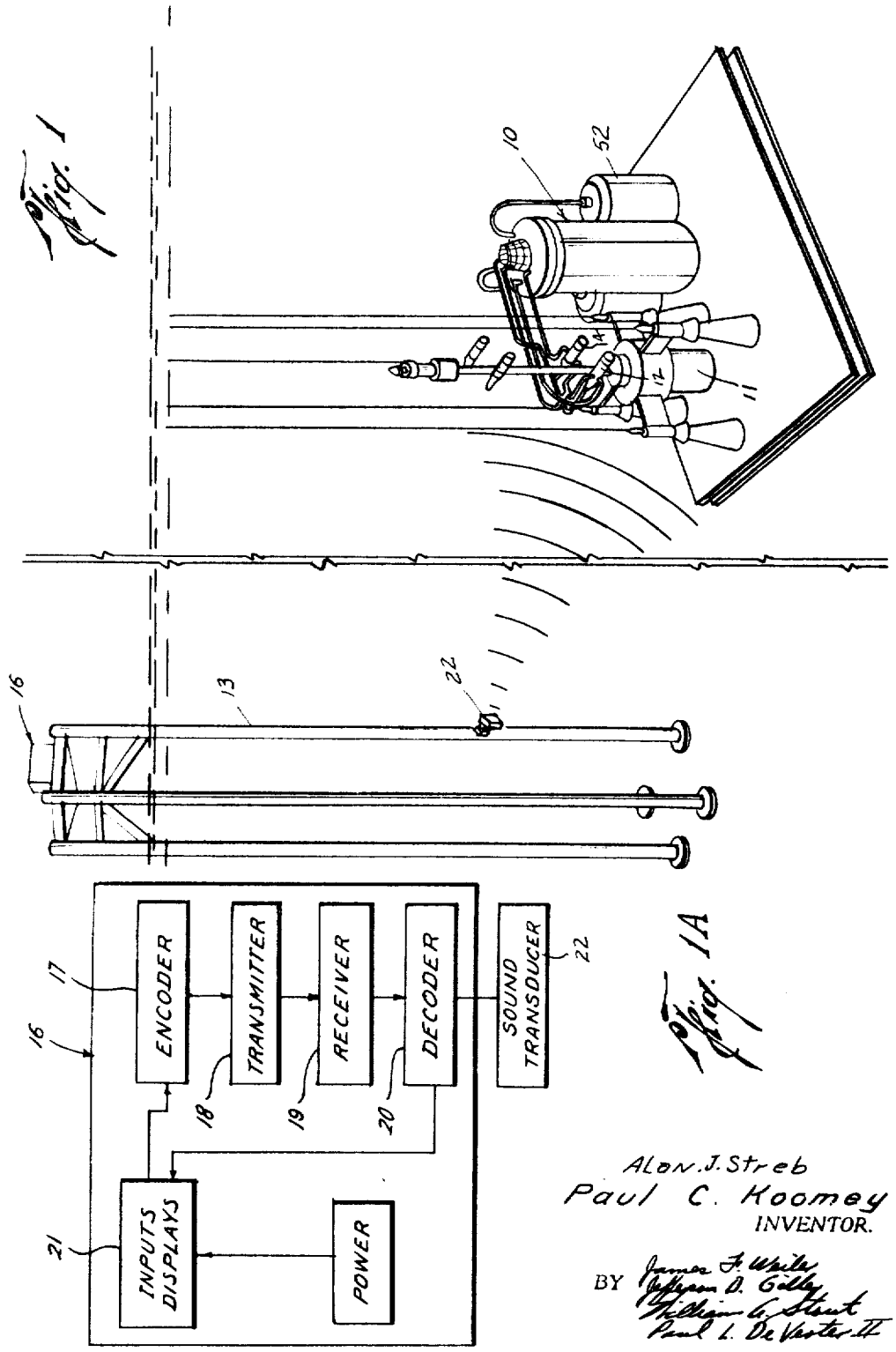

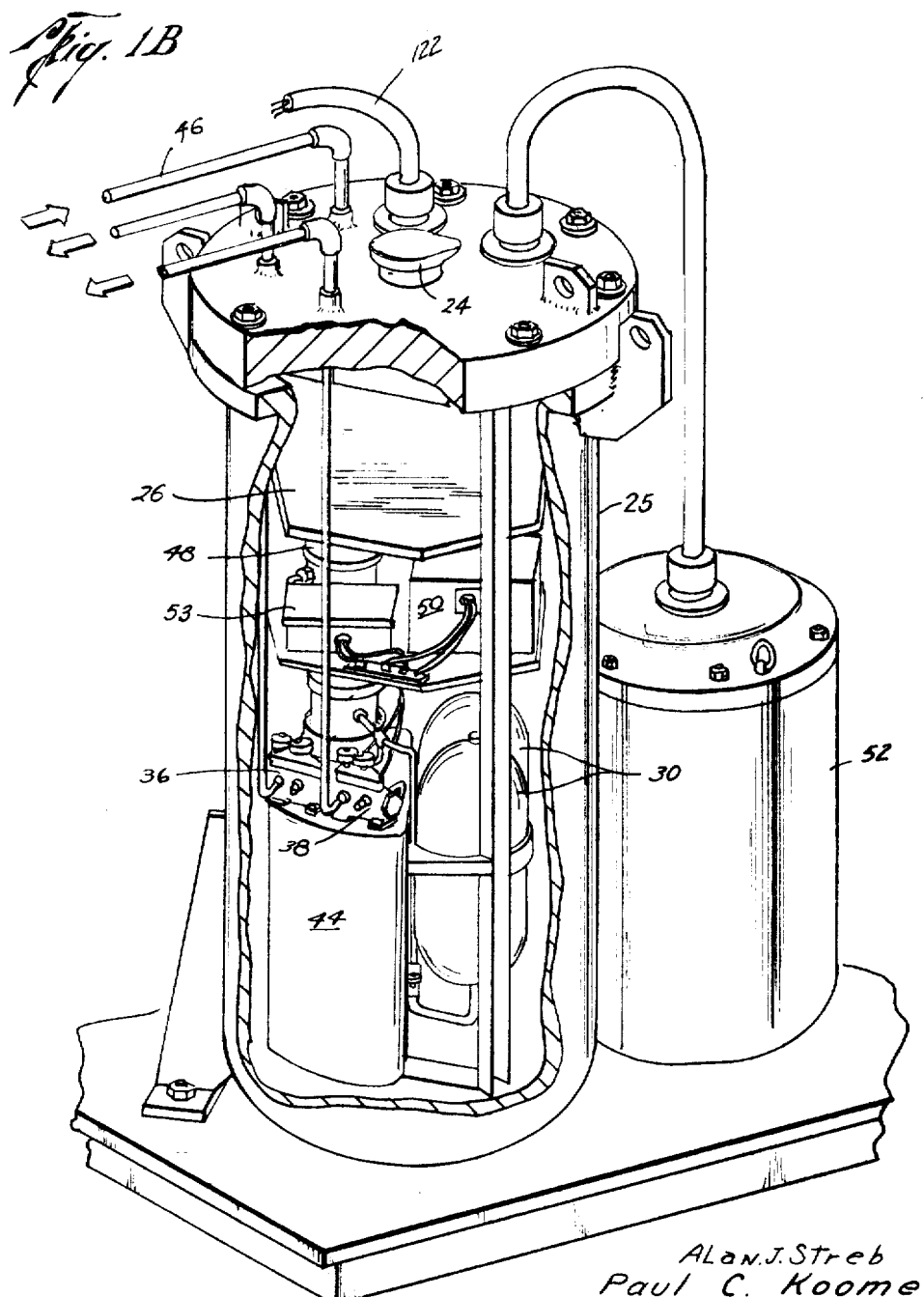

Fig. 2

Alon J. Streb
Paul C. Koomey
INVENTOR.

BY
James F. Weiler
Jefferson D. Giller
William A. Stout
Paul L. DeVerter II
ATTORNEYS Paul C. Koomey
Alon J. Streb

BY
ATTORNEYS

United States Patent Office 3,405,387
Patented Oct. 8, 1968

3,405,387
ACOUSTICAL UNDERWATER CONTROL APPARATUS
Paul C. Koomey, Houston, Tex., and Alan J. Streb, Baltimore, Md.; said Koomey assignor, by mesne assignments, to C. Jim Stewart & Stevenson, Inc., Houston, Tex., a corporation of Texas, and said Streb assignor to Martin Marietta Corporation, New York, N.Y., a corporation of Delaware
Filed Oct. 24, 1965, Ser. No. 504,742
6 Claims. (Cl. 340—5)

ABSTRACT OF THE DISCLOSURE

An acoustical control apparatus for controlling the operation of underwater valve equipment from the surface by coded acoustical signals and monitoring the status of the equipment by acoustical signals. A radioisotope thermoelectric generator positioned underwater continuously charging a battery which powers a pump for maintaining hydraulic pressure in an accumulator for actuating an underwater valve, all of which is controlled and monitored about the water surface by the use of coded acoustical signals.

---

Figure 3:
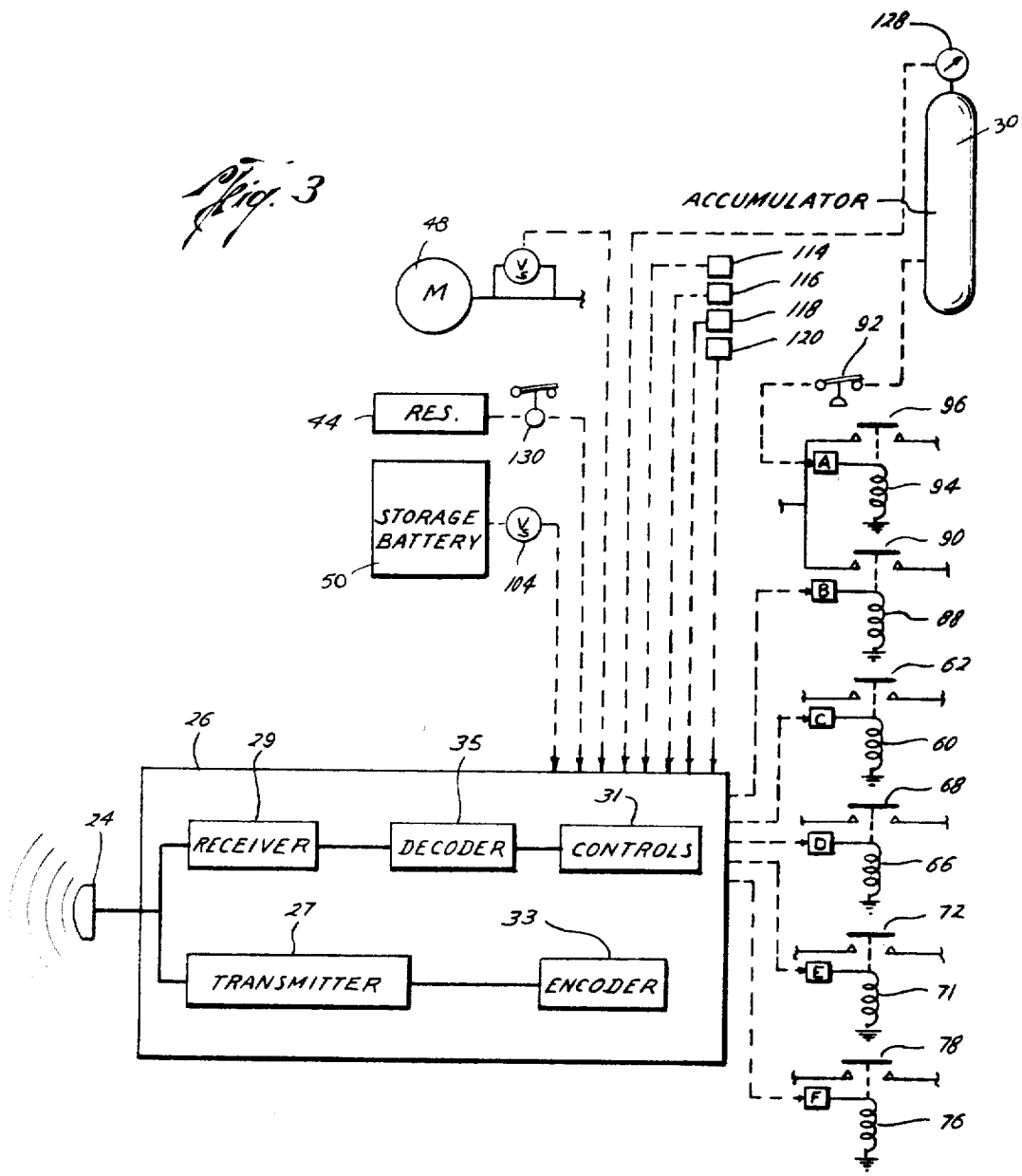

The present invention relates to an acoustical underwater control apparatus, and more particularly, relates to an apparatus for controlling underwater equipment by acoustical signals between a control station and the underwater equipment.

Generally, various types of underwater control equipment are used such as blowout preventer controls, well head controls, pipeline valve controls, and control of underwater storage facilities. However, the control systems presently in use to operate such underwater equipment generally requires the use of electrical cables, hydraulic lines, or other physical connections from the surface to the underwater equipment. However, such control lines and cables are disadvantageous as they frequently interfere with drilling operations, and are cut or damaged by boats as well as being damaged or blown away by storms and hurricanes.

It is the general object of the present invention to provide a control system for controlling underwater equipment which will have no physical connection or at least a minimum number of control lines extending between the surface and the underwater equipment.

It is still a further object of the present invention to provide underwater control apparatus for operating underwater equipment by means of acoustical signals thereby eliminating control lines and cables extending towards the water surface.

A still further object of the present invention is the provision of an acoustical underwater control apparatus for acoustically controlling underwater equipment and for monitoring the status of the underwater equipment by receiving acoustical status signals.

Still a further object of the present invention is the provision of acoustical signals to open and close underwater devices and to gather and transmit to the surface acoustical signals providing information as to the status of said underwater equipment.

Yet a further object of the present invention is the provision of an acoustical underwater control apparatus for controlling underwater hydraulically actuated equipment by providing a hydraulic accumulator adjacent the equipment, electrical switching means controlling the actuation of the equipment by the accumulator, providing electrically actuated pumps for maintaining hydraulic pressure in the accumulator, and providing battery means positioned adjacent the equipment providing the necessary electrical power, and controlling the operation of the equipment from the surface by means of acoustical signals.

Still a further object of the present invention is the provision of an acoustical control system for control of underwater equipment from the surface by providing electrical control means positioned underwater for actuation of the equipment, an underwater acoustical receiver connected to and actuating the electrical control means and an acoustical transmitter and control means positioned above the water for transmitting controlling signals to the underwater receiver.

Yet a further object of the present invention is the provision of an acoustical underwater control apparatus which does not require physical connections to the surface control station and which will operate for extended periods of time without maintenance by providing an underwater power generator for continuously charging a storage battery for providing the necessary power for operating hydraulically operated valves in a hydraulic system including an accumulator which is periodically charged from the opening and closing sub-surface equipment and obtaining status information on the valves by means of acoustical signals.

Still a further object of the present invention is the provision of an underwater acoustical control system having a nuclear powered energy source that will operate underwater equipment without connections to the surface for extended unattended periods in which communication between a surface control station and the underwater system is accomplished by coded acoustical signals.

Still a further object of the present invention is the provision of an underwater control system having a power system which includes a radioisotope thermoelectric generator as a primary energy source, a power conditioner which increases and regulates the voltage of the primary power, and an electrochemical storage battery to store for the peak load requirement during the system actuation.

Yet a further object of the present invention is the provision of an acoustically controlled underwater control apparatus for controlling hydraulically actuated valves positioned underwater by providing a hydraulic accumulator supplying the hydraulic fluid for actuation of valves, an electrically operated pump for maintaining the necessary actuation pressure in the accumulator, electrical switching control means for controlling the actuation of the valve, a continuously charged battery supplying energy for operation of the system, electrical position indicating means connected to the valve for providing signals indicating the position of the valve, and acoustical transmitting and receiving means underwater and on the surface for providing control signals from the surface and supplying positioning signals to the surface.

Figure 4:
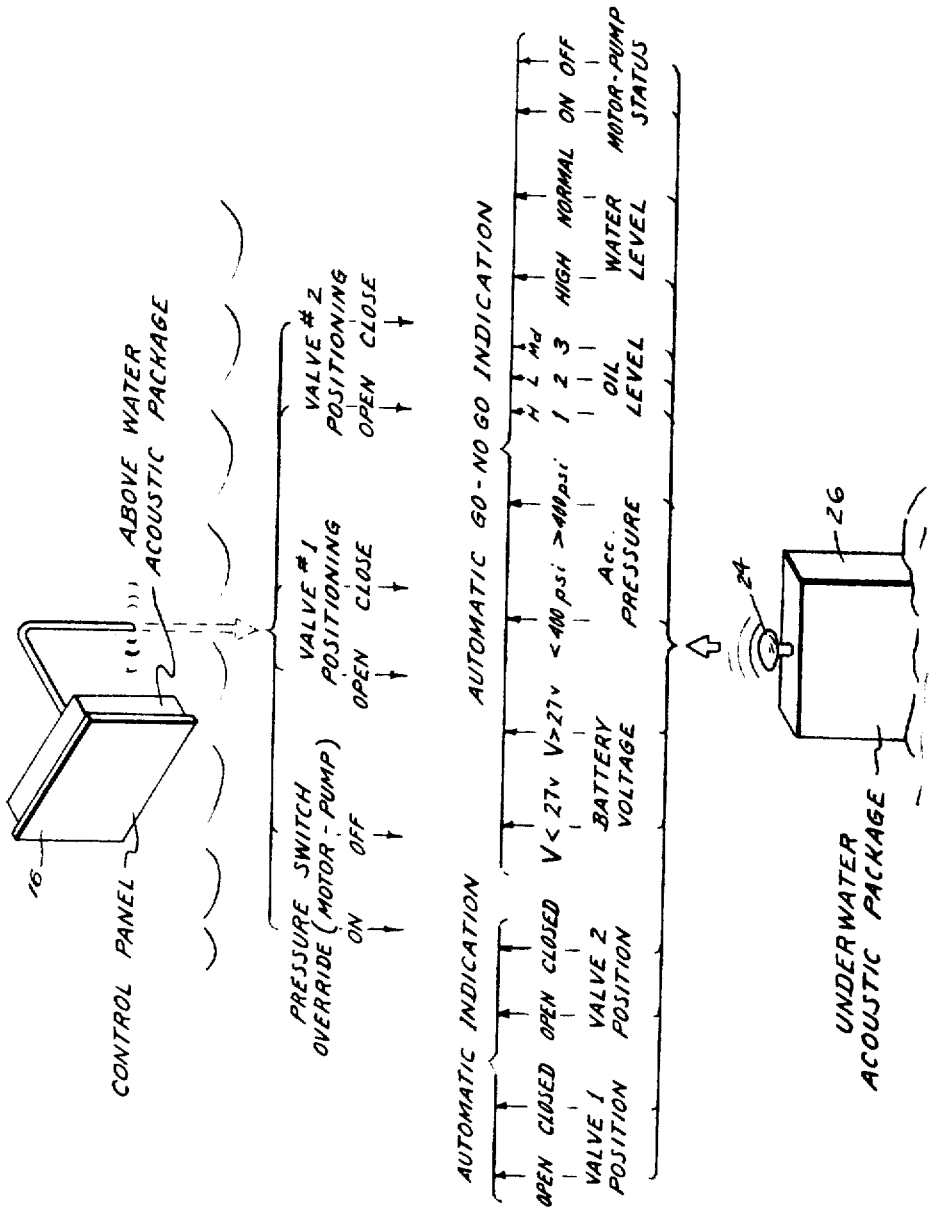
Figure 5:
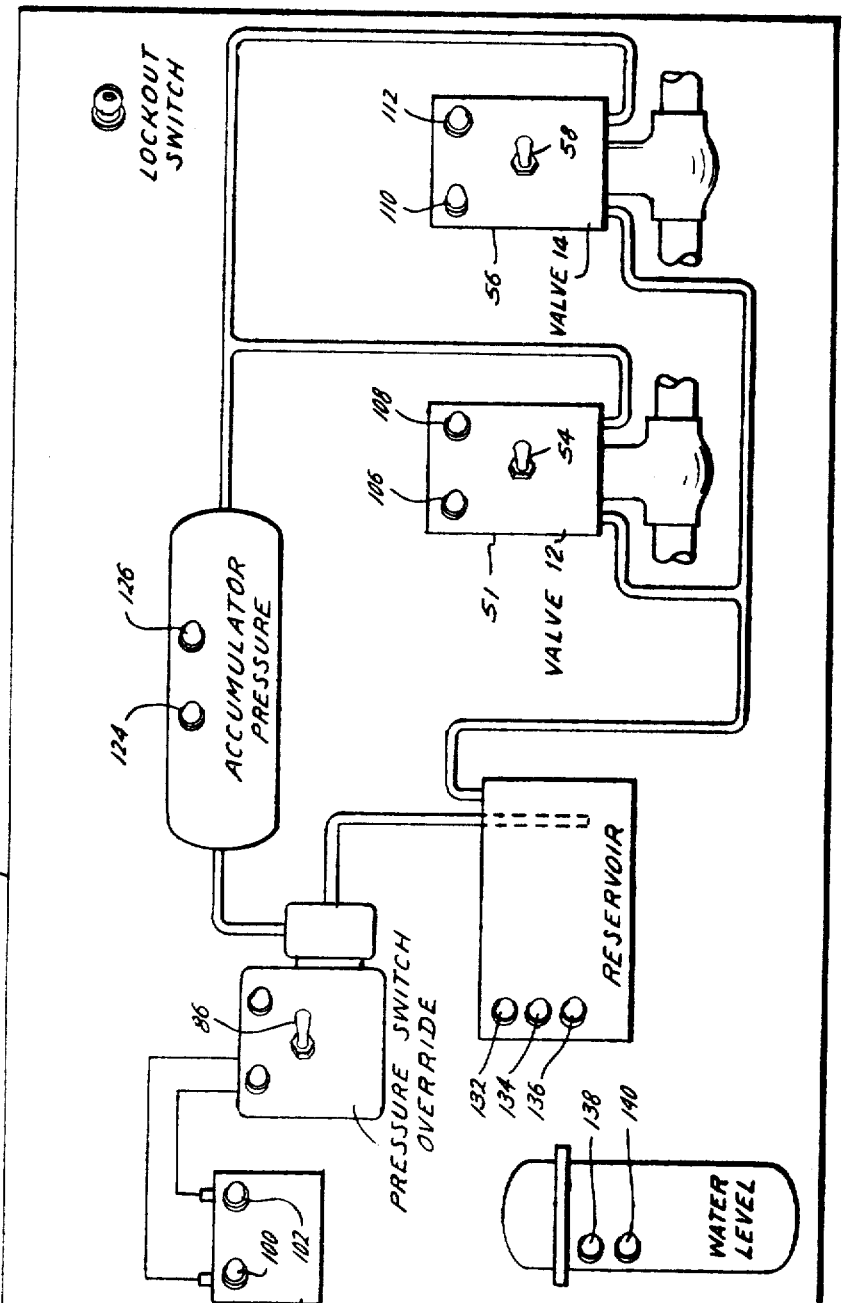

Other and further objects, features and advantages will be apparent in the following description of a presently preferred embodiment of the invention, taken into conjunction with the accompanying drawings in which like character references designate like parts throughout the several views, and where, FIGURE 1 is an elevational view, partly schematic, and partly in cross-section, illustrating the apparatus of the present invention in use for controlling underwater well head valves, FIGURE 1A is a block diagram of the control panel of FIGURE 1, FIGURE 1B is an enlarged elevational view, partly in cross-section showing the underwater controls of FIGURE 1, FIGURE 2 is a hydraulic and electrical schematic diagram of the power controls of the apparatus of FIGURE 1, FIGURE 3 is a schematic diagram of the electrical status and control system of the apparatus of FIGURE 1, FIGURE 4 is a schematic of the acoustical signals transmitted in the apparatus of FIGURE 1, and FIGURE 5 is a graphic representation of the control panel at the surface of the apparatus of FIGURE 1.

While the present invention will be described in its use as controlling and operating valves at an underwater wellhead, it will be apparent that the present invention is not so limited, but can be used to operate and control other types of underwater equipment, by way of example only, blowout preventer controls, pipeline controls and underwater storage controls.

Referring now to FIGURE 1, the numeral 10 generally indicates the underwater acoustical apparatus of the present invention in use in controlling two valves 12 and 14 (FIGURE 2) positioned underwater at a wellhead 11, by coded acoustical transmission and without the necessity of a physical connection between the control station and the valves. The apparatus 10 generally includes a control station 16, which may be suitably positioned above the water surface such as on an offshore rig 13 and which sends and receives acoustical signals to the underwater equipment through a sound transducer 22. As drawn in FIGURE 1A, the control station 16 includes an encoder 17, a transmitter 18, and a receiver 19, and a decoder 20 connected to a control panel 21. The underwater portion of the apparatus 10 also includes a sound transducer 24 (FIGURE 3) which is connected to a control package 26 which includes a suitable acoustical transmitter 27 and receiver 29, electrical controls 31, encoder 33, and decoder 35 for actuating and signaling the status of the valves 12 and 14.

Preferably, and referring to FIGURE 2, the valves 12 and 14 are hydraulically actuated valves which are operated by hydraulic fluid from an accumulator 30. Hydraulic fluid flows from accumulator 30 through line 32 to valve 12, and through line 34 to valve 14, which lines are respectively controlled by suitable valve and control means such as solenoid valves 36 and 38 respectively. The solenoid actuated valves are three way, two positioned, control valves which in the position shown in FIGURE 2 conduct high pressure hydraulic fluid from the accumulator 30 to the wellhead valves 12 and 14 to place them in the open position. The control valves are conventional dual solenoid actuated and detent locked so that once the solenoid is actuated no further electrical energy is required to hold the valve in position. The three way control valves transmit high pressure fluid to the wellhead valves 12 and 14 to open them, and vent the wellhead valves 12 and 14 to a reservoir 44 for closing. Thus, no fluid flows through the valves 12 and 14, and the pressure in the accumulator 30 will keep the valves open without further action from the hydraulic system since check valve 40 will prevent back flow from the accumulator 30. When the solenoid valves 36 and 38 are actuated to the closed position, the solenoid valves will move in the second position thereby venting the high pressure fluid in the valves through line 42 to a fluid reservoir 44. Since the second sides of the valves 12 and 14 are connected to an exhaust line 46 leading to the reservoir 44, there will be no differential pressure across the valves 12 and 14 and the wellhead valves 12 and 14 will be closed by fail closed springs to place them in the closed position. Valves 12 and 14 are conventional spring loaded fail close types and therefore no additional hydraulic energy is required to close them once they are open and satisfactory valves may be obtained from W.K.M.

The accumulator 30 is preferably two gas precharged hydraulic accumulators connected in parallel either one of which is capable of operating the system in the event of a leak and conventional Koomey type units are satisfactory. In order to keep the hydraulic actuation system charged for use a conventional pump 46 operated by a DC motor 48 may be provided to pump fluid from the reservoir 44 to the accumulator 30 to maintain the required operating pressure in the accumulator 30.

As is noted from FIGURE 1, all of the hydraulic components are positioned in the housing 26 adjacent the valves 12 and 14 thereby eliminating the need for a plurality of hydraulic hoses leading to the surface. Of course, if desired the accumulator 30, pump 46, motor 48 and reservoir 44 could be placed above the water in the barge 20 with only a single hydraulic line leading underwater to the solenoid valves 36 and 38 by venting the return line 46 to the water. However, the structure shown in FIGURE 1 avoids the necessity of any control or power cables which might interfere with oilwell operations and which would be subject to severence.

Of course, if desired, the valves 12 and 14 may be directly operated by electrically powered equipment such as solenoids or reversible electric motors and in that event the hydraulic control equipment may be omitted.

The electrical power supply (FIGURE 1B) includes a storage battery 50 to provide the electrical energy for operating the DC motor 48, the solenoid valves 36 and 38 and the acoustical and electrical control package 26. However, the use only of a storage battery would require that the apparatus 10 be brought to the surface and recharged or replaced approximately every three months. Therefore for unattended extended periods of time, for example of up to three or more years, a generator 52 may be provided such as a radioisotope thermoelectric generator such as manufactured by the Martin Company as a primary power source, including a power conditioning device 53, if desired, manufactured by the same company, that would step up the generator voltage to a higher value and regulate the voltage as necessary to continuously supply power to the storage battery 50 which is preferably of a nickel-cadmium type. The thermoelectric generator derives its energy from a source of heat from the decaying energy of the radioisotope fuel which is then partially converted into electricity by direct energy conversion, and provides a device having no moving parts which can operate unattended for long periods of time.

The communications and control subsystem performs the functions of actuating the valves 12 and 14 from the control station 16, determining the status of various components of the system, and reporting the status to the control panel 16, and in addition, may perform a closed loop control to keep the accumulators 30 at operating pressure. Referring now to FIGURES 1, 3, 4, and 5, control station 16 includes a graphic control panel showing graphically the underwater components, and includes suitable control and status equipment. Thus, valve 12 shown graphically on panel 51 includes a switch 54 for opening and closing valve 12. Similarly, valve 14 includes an operational panel 56 having a switch 58 for operating valve 14. Thus, movement of one of the switches 54 or 58 is transmitted to encoder 17, and to transmitter 18 to provide a coded acoustical signal at the control 16 by conventional equipment to the upper sound transducer 22. Communications are coded for example a frequency code similar to that used in FM radio, so that no spurious underwater noises can accidently trip the system since the receiver is on at all times. The input signal is picked up by the underwater sound transducer 24 by receiver 29, decoded by decoder 35 and converted to an electrical control signal by suitable controls 31. Thus, a signal would be sent out from the control package 26 to relay 60 (FIGURES 2 and 3) to close contacts 62 to energize solenoid 64 in the event the solenoid valve 36 is to be opened. On the other hand, if the solenoid valve 36 is to be closed a signal is sent from the package 26 to relay 66 closing contact 68 thereby energizing solenoid 70 to actuate solenoid valve 36 to close and relieve fluid pressure on valve 12. Similarly, signals sent to coil 71 act to close contact 72 to actuate solenoid 74 opening solenoid valve 38. And signals sent to coil 76 close contacts 78 to energize solenoid 82 to close hydraulic solenoid valve 38.

Referring again to FIGURE 5 the graphic control panel includes a switch 86 for controlling the DC motor 48 for increasing the fluid pressure in the accumulator 30. Thus, by actuating switch 86 a coded acoustical signal is sent from encoder 17 and transmitter 18 to the control package 26 for conversion to an electrical signal which is transmitted to coil 88 (FIGURES 2 and 3) closing contact 90 to actuate the DC motor 48 to increase the fluid pressure in the accumulator 30. If desired, an automatic pressure switch 92 is provided (FIGURE 3) which monitors the accumulator pressure and in the event that the pressure drops below a predetermined level will actuate a relay 94 and close contact 96 to automatically operate the motor 48. Referring to FIGURES 3, 4, and 5, it is noted that in addition to the actuation or control signals that are sent from the surface to the subsurface equipment, the graphic control panel has indicating lights to indicate the status of different system perameters such as battery voltage, accumulator pressure, position of the wellhead valves 12 and 14, reservoir level, pump motor on or off and water level in the housing 26. Thus, in FIGURE 5, lights 100 and 102 indicate whether the battery voltage is normal or low and this information is obtained from voltage sensor 104 (FIGURE 3) which measures the battery voltage, transmits this to the control package 26 where it is converted to an acoustical coded signal by encoder 33 and transmitted by transmitter 27 to the control station 16 where it is received by receiver 19 and decoded by decoder 20 to display the information. Similarly, the open 106 and close 108 indicating lights on the graphic control panel (FIGURE 5) and indicating lights 110 and 112 indicate respectively whether the valves 12 and 14 are open or closed. This information is obtained from limit switches 114, 116, 118, and 120 (FIGURE 3) which is transmitted through cable 122 (FIGURE 1B) from the valves 12 and 14 to the control package 26 to again be encoded and transmitted to the surface to indicate the position status of valves 12 and 14. Similarly indicating lights 124 and 126 in FIGURE 5 indicate whether the accumulator pressure is normal or low and is obtained from the pressure sensor 128 (FIGURE 3) which is again transmitted to the surface by acoustical signals. And a fluid level sensor 130 (FIGURE 3) monitors the level of the hydraulic fluid in the reservoir 44 and transmits this information to the graphic control panel wherein lights 132, 134, and 136 clearly indicate this information. And to indicate a possible leak in the housing 25, high and normal water level indicating lights 138 and 140 are provided, which are controlled by a level switch (not shown) in the housing. A summary of the signals which are sent from the control panel 16 to the underwater control package 26 and of the status information returned from the underwater package 28 to the control panel 16 are clearly shown in FIGURE 4. Thus, in operation the status of the various components is recorded by means of lights indicating the position of the valves, reservoir 44 oil pressure, water level in the main housing 25, accumulator 30 pressure, pump motor 48 operation, and battery 50 voltage. In addition, the accumulator pressure switch 92 (FIGURE 3) will automatically maintain the necessary accumulator pressure for operating the valves 12 and 14. However, if desired, switch 86 on the control panel 16 (FIGURE 5) may be actuated to override pressure switch 92 and build up greater accumulator pressure by sending a coded acoustical signal to the control package 26 where the acoustical signal is decoded, and converted to an electrical signal to actuate relay 88 closing contact 90 to energize DC motor 48 and pump hydraulic fluid from the reservoir 44 to the accumulator 30.

When it is desired to operate one of the underwater valves 12 or 14, switches 54 and 58 may be actuated to generate an acoustical signal from the control panel 16 through encoder 17 and transmitter 18, to sound transducer 22, to the underwater sound transducer 24 to the control package 26 where the signal is received by receiver 29, decoded by decoder 35, and converted to an electrical signal to actuate one of the coils 60, 66, 70, or 76 respectively, so as to actuate the hydraulic solenoid valves 36 and 38 to either direct hydraulic fluid from the accumulator 30 to the valves 12 and 14 or to cut off the flow of fluid to the valves 12 and 14 whereby they are suitably closed. And of course, the status of the valves are visually observed by the indicating lights 106, 108, 110 and 112 by the movement of the corresponding limit switches 114, 116, 118 and 120 on the valves 12 and 14. Similarly, the status of the battery 50 voltage, accumulator 30 pressure, reservoir 44 level, pump 46 status, and water level in the housing 26 is similarly monitored, coded, transmitted to the surface control panel 16 where it is decoded and the information is flashed on a corresponding indicating light.

By way of example, only the transmitter may operate on a carrier frequency of 200,000 c.p.s. and the sending signals may vary such as by 1000 cycles for decoding purposes.

Thus, the acoustical underwater control system of the present invention will provide a control system without connection to the surface for extended unattended periods of time, and will display on the surface control panel the status of the various operative components of the system.

The present invention, therefore, is well suited to carry out the objects and attain the ends and advantages mentioned as well as others inherent therein. While a presently preferred embodiment of the invention is given for the purpose of disclosure, numerous changes and details of construction and arrangements of parts may be readily made which will suggest themselves to those skilled in the arts and which are encompassed within the spirit of the invention and the scope of the appended claims.

What is claimed is:

1. An acoustical control system for control of an underwater valve from the water surface comprising,
   electrical control means positioned underwater for opening and closing said valve,
   an acoustical underwater receiver connected to and actuating said control means,
   an acoustical transmitter and control means located in the vicinity of said water surface including a sound transducer positioned in said water for transmitting valve controlling signals to said underwater receiver,
   a battery positioned underwater supplying power to actuate said valve, and
   a radioisotope thermoelectric generator positioned underwater and connected to said battery for continuously charging said battery.

2. An acoustical control system for controlling underwater equipment comprising,
   a hydraulically actuated valve positioned underwater,
   a hydraulic accumulator positioned underwater for supplying hydraulic fluid for actuation of said valve,
   an electric motor for maintaining hydraulic pressure in said accumulator,
   electrical switching means positioned underwater for actuating the opening and closing of said valve,
   electrical control means positioned underwater for controlling the actuation of said motor and electrical switching means,
   battery means positioned underwater providing electrical power and electrically connected to said motor and switching means,
   a nuclear thermoelectric generator positioned underwater and connected to said battery means for continuously charging said battery means,
   an acoustical receiver connected to and controlling said electrical control means; and
   an acoustical transmitter and control circuit means located in the vicinity of said water surface and including a sound transducer positioned in said water for transmitting valve control signals to said underwater receiver.

3. The apparatus of claim 2 including, acoustical encoding means connected to said transmitter, and acoustical decoding means connected to said receiver.

4. The apparatus of claim 2 wherein said nuclear thermoelectric generator utilizes radioisotope fuel.

5. A system for the remote operation of an underwater device comprising, a device located beneath the surface of a body of water and operable upon application of energy from an external source, an external source of energy located adjacent said device, said external source of energy including a battery and a nuclear thermoelectric generator connected to said battery for continuously charging said battery, means located in the vicinity of said water surface for transmitting a wireless control signal through said water, and means located adjacent said device for receiving said control signal and for connecting said source of energy to said device upon receipt of same.

6. The system of claim 5 wherein said nuclear thermoelectric generator utilizes radioisotope fuel.

References Cited

UNITED STATES PATENTS

| 3,126,559 | 3/1964 | Alexander | 9—10 |
| 3,138,778 | 6/1964 | Dulin | 340—15 |
| 2,293,676 | 12/1966 | Link | 340—16 X |

RICHARD A. FARLEY, *Primary Examiner.*